United States Patent [19]

St. Clair

[11] Patent Number: 5,342,885
[45] Date of Patent: Aug. 30, 1994

[54] EPOXY RESIN COATING WITH COOH-GRATED HYDROGENATED BLOCK COPOLYMER

[75] Inventor: David J. St. Clair, Houston, Tex.

[73] Assignee: Shell Oil Company, Houston, Tex.

[21] Appl. No.: 448,189

[22] Filed: Dec. 8, 1989

[51] Int. Cl.$^5$ .................... C08L 33/14; C08L 63/02; C08L 63/04

[52] U.S. Cl. ........................... 525/65; 523/436; 525/179; 525/194; 525/198; 525/207

[58] Field of Search .............. 525/65, 179, 194, 198, 525/207

[56] References Cited

U.S. PATENT DOCUMENTS

| | | | |
|---|---|---|---|
| B1 4,444,953 | 8/1987 | St. Clair | 525/98 |
| Re. 27,145 | 6/1971 | Jones | 260/880 |
| 2,450,940 | 10/1948 | Cowan et al. | 260/404.5 |
| 3,231,635 | 1/1966 | Holden et al. | 260/880 |
| 3,265,765 | 8/1966 | Holden et al. | 260/876 |
| 3,322,856 | 5/1967 | Holden et al. | 260/876 |
| 3,336,241 | 8/1967 | Shokal | 260/2 |
| 3,494,942 | 2/1970 | Miki et al. | 260/397.5 |
| 3,634,549 | 1/1972 | Shaw et al. | 260/880 |
| 3,670,054 | 6/1972 | De La Mare et al. | 260/880 B |
| 3,700,633 | 10/1972 | Wald et al. | 260/880 B |
| 3,804,735 | 4/1974 | Radlove et al. | 204/159.23 |
| 3,892,819 | 7/1975 | Najvar | 260/836 |
| 3,948,698 | 4/1976 | Elrick et al. | 149/19.6 |
| 4,014,771 | 3/1977 | Rosenkranz et al. | 204/159.23 |
| 4,033,888 | 7/1977 | Kiovsky | 252/56 D |
| 4,077,893 | 3/1978 | Kiovsky | 252/56 R |
| 4,119,609 | 10/1978 | Allen et al. | 528/99 |
| 4,141,847 | 2/1979 | Kiovsky | 252/51.5 A |
| 4,253,930 | 3/1981 | Tsuchiya et al. | 204/181 |
| 4,292,414 | 9/1981 | Saito et al. | 525/255 |
| 4,308,353 | 12/1981 | Saito et al. | 525/74 |
| 4,371,665 | 2/1983 | Hino et al. | 525/109 |
| 4,386,173 | 5/1983 | Chang | 523/453 |
| 4,391,949 | 7/1983 | St. Clair | 525/99 |
| 4,431,782 | 2/1984 | Harris et al. | 525/531 |
| 4,437,892 | 3/1984 | Kelsey | 106/15.05 |
| 4,507,411 | 3/1985 | Gordon et al. | 523/436 |
| 4,578,429 | 3/1986 | Gergen et al. | 525/291 |
| 4,755,542 | 7/1988 | Cavitt et al. | 523/172 |
| 4,786,668 | 11/1988 | Dewhirst | 523/445 |

FOREIGN PATENT DOCUMENTS

| | | | |
|---|---|---|---|
| 57-149369 | 9/1982 | Japan | C09J 3/14 |
| 57-149370 | 9/1982 | Japan | . |
| 58-17160 | 2/1983 | Japan | . |
| 56-138397 | 3/1983 | Japan | . |
| 62-143912 | 12/1988 | Japan | C08G 59/40 |
| 63-308027 | 12/1988 | Japan | . |

OTHER PUBLICATIONS

"Kraton ® Rubber Modified Epoxy Blends", by Pottick, 34th International SAMPE Symposium, pp. 2243–2254 (1989).

Primary Examiner—Robert E. Sellers
Attorney, Agent, or Firm—James O. Okorafor

[57] ABSTRACT

A coating composition is provided from about 0.5 to about 80 parts by weight of a modified selectively hydrogenated block copolymer comprising at least one block of predominantly vinyl arene monomer units and at least one block which is, before hydrogenation, predominantly conjugated diolefin monomer units, the modified block copolymers having been modified by grafting predominantly to the conjugated diolefin block a carboxylic acid or acid derivative and 100 parts by weight of an epoxy resin. The blend of the modified block copolymer and epoxy resin is heated to above 150° C. for a time sufficient for the carboxylic acid or acid derivative to form an adduct with the epoxy resin. The modified block copolymer forms a stable suspension in the epoxy after the adduct is formed which greatly enhances storage stability.

10 Claims, No Drawings

EPOXY RESIN COATING WITH COOH-GRATED HYDROGENATED BLOCK COPOLYMER

BACKGROUND OF THE INVENTION

This invention relates to a novel method of preparing a coating composition and the coating composition prepared by that process. The composition comprises an epoxy resin and a functionalized hydrogenated elastomeric block copolymer. In another aspect, this invention relates to a coating composition comprising an epoxy resin, an epoxy adduct of a modified hydrogenated elastomeric block copolymer, and a curing agent.

Epoxy resins have long been utilized in coating compositions. Although cured epoxy resins are very hard, have excellent adhesion to most substrates and can form a very high gloss coating, they are generally rather brittle and easily crack under impact. Cured compositions based on high equivalent weight epoxy resins are significantly less brittle than cured compositions based on lower equivalent weight epoxy resins, but they are not easily handled or applied to workpieces. High equivalent weight epoxies are solids at room temperature and may be dissolved only in relatively dilute solutions. Additionally, solutions of high equivalent weight epoxies with greater than about 60% w solids contents are generally too viscous for application at room temperature. Use of these larger amounts of solvent is undesirable due to concerns of cost, environment, health and safety.

Another route to providing a less brittle epoxy coating is to add elastomeric materials to epoxy coatings and improve their flexibility via a rubber-toughening mechanism. Early attempts to accomplish this objective have included the incorporation in the epoxy of a low molecular weight liquid polymer which had been modified to incorporate reactive groups. Typical modified liquid polymers used to toughen epoxy based coatings are carboxyl terminated polybutadiene or carboxyl terminated butadiene-acrylonitrile copolymer. Molecular weights of about 5000 are usually preferred and, for example, a range from 2000 to 20,000 is taught by Gordon in U.S. Pat. No. 4,507,411. Higher molecular weight polybutadienes cause the epoxy resin composition to be too viscous. These low molecular weight polybutadienes are fairly soluble in epoxy resins before curing, but separate (precipitate) into an incompatible elastomeric phase upon curing of the epoxy resin. It is, then, difficult to control the size of the elastomer domains since it is difficult to control the rate of precipitation of the elastomeric phase. The resulting composition also exhibited a significantly lower softening temperature and a significantly lower glass transition temperature than the epoxy resin by itself.

Carboxyl terminated polybutadiene-epoxy compositions also exhibit poor thermal and oxidative stability due to the presence of unsaturated conjugated dienes.

The incorporation of carboxyl terminated butadiene-acrylonitrile copolymers instead of carboxyl terminated polybutadiene in epoxy compositions improves the compatibility of the elastomeric phase with the cured epoxy phase because of the more polar nature of the elastomeric phase. These compositions do not otherwise overcome the shortcomings of carboxyl terminated polybutadiene-epoxy resin compositions.

Heat curable molding compositions of epoxy resin toughened by acid functionalized selectively hydrogenated vinyl arene-conjugated diene block copolymers containing one or more blocks of polymerized conjugated diene and one or more blocks of polymerized vinyl arene are taught in Japanese Patent No. 58-17160. In the Japanese Patent '160, acid functionalized hydrogenated styrene-butadiene block copolymers which are solids at room temperature are incorporated into the epoxy resins without resulting in an excessively viscous composition prior to curing. Such compositions are disclosed as having excellent toughness, as measured by Izod impact strength, and adequate hardness and rigidity. The Japanese Patent specification discloses that the composition may be used as a coating, but there is no indication that a specific blending process is required to obtain an acceptable dried and cured coating from the composition. The examples of Japanese Pat. '160 are prepared by melt blending modified block copolymer which has been freeze-pulverized to a size of 80 mesh into an epoxy resin. Applicant has found that when a composition prepared in this manner is combined with hydrocarbon solvent and curing agent, dried and cured, the resultant coating had a very rough surface giving unacceptably low gloss, rendering the product nearly useless as a coating component.

A thermoplastic elastomer adhesive composition similar to the molding composition taught in Japanese Pat. '160 is taught in Japanese Pat. Application Publication No. 57-149369. The adhesive composition contains a functionalized hydrogenated monovinyl arene-conjugated diene block copolymer and an epoxy resin. A curing agent is not utilized because the epoxy groups act to crosslink the functionality of the block copolymer. The amount of epoxy resin in the adhesive composition is between 5 and 100 parts by weight for 100 parts by weight of functionalized block copolymer. Again, there is no indication that this composition would be useful as a coating composition, and no indication that a specific blending process is required to obtain an acceptable coating from such a blend. Additionally, because the epoxy component is present in only a minor amount, it acts as a crosslinking agent for the functionalized block copolymers, the epoxy curing agent is therefore not used and polyepoxide is never formed.

Hata, in Japanese Patent Application No. 62-143,912, discloses an epoxy composition containing a hydrogenated styrene-butadiene block copolymer. The block copolymer is present in an amount of 5 to 100 parts by weight for 100 parts by weight of epoxy resin. The block copolymer is claimed to be present as a dispersed phase with an average particle size of 0.05 to 10 microns. The particle size required is obtained by dissolving the block copolymer and the epoxy resin in a solvent, and then vaporizing the solvent at 60° C. under a vacuum. Under these conditions, practically no chemical reaction occurs between the epoxy resin and the functionalized hydrogenated block copolymer. Although this composition, when cured, has excellent mechanical, chemical, and adhesive properties, and gives a much smoother coating than the composition of Japanese Pat. '160, cured coatings based on this composition still contain a substantial amount of grit causing less than acceptable gloss and reducing quality of appearance of the coating.

It is an object of the present invention to provide a process to produce an epoxy resin-modified hydrogenated block copolymer coating composition wherein the coating composition produced has good phase stability and low viscosity before curing, and when combined with a curing agent, applied to a workpiece and cured, has excellent gloss, hardness and flexibility. In another aspect it is an object to provide an epoxy resin-modified hydrogenated block copolymer coating composition which, after being cured, has excellent gloss, hardness and flexibility.

SUMMARY OF THE INVENTION

The composition prepared by the method of this invention has improved phase stability and after drying and curing has excellent gloss, flexibility, adhesion, toughness and impact resistance.

The process for preparation of the coating composition comprises: blending a modified hydrogenated block copolymer of a monoalkenyl aromatic and a conjugated diene, the block copolymer having been modified by grafting substantially to the conjugated diene blocks an acid or acid derivative, with an epoxy resin and maintaining the modified block copolymer-epoxy resin blend at an elevated temperature for a time period sufficient to achieve reaction of the block copolymer functionality with the epoxy groups. The components may be melt blended, if the modified hydrogenated block copolymer is in the form of pellets, or solution blended. In another aspect, the present invention provides a coating composition comprising: a modified hydrogenated block copolymer; and an epoxy resin, wherein epoxy groups of the resin are reacted with the block copolymer functionality while being subjected to high shear mixing.

DETAILED DESCRIPTION OF THE INVENTION

In general, any of the epoxy compounds known in the prior art to be useful in epoxy resin compositions may be used in the epoxy resin composition of this invention. Suitable epoxy compounds include essentially any compound containing at least one pendant or terminal 1,2-epoxy group; i.e., vicinal epoxy group, per molecule. Suitable epoxy compounds may be saturated or unsaturated, aliphatic, cycloaliphatic, aromatic or heterocyclic and may be substituted, if desired, with non-interfering substituents such as halogen atoms, hydroxyl groups, ether radicals and the like. Suitable epoxy compounds may be monomeric or polymeric. Suitable epoxy compounds may also be liquid or solid at standard temperature and pressure. Liquid epoxy resins are preferred over solid epoxy resins because their lower viscosity facilitates dispersion of the modified block copolymer in the epoxy resin.

Examples of useful epoxies include the polyglycidyl ethers of polyhydric alcohol and polyhydric phenols and polyhydric phenol condensation products, polyglycidyl amines, polyglycidylamides, polyglycidylimides, polyglycidylhydantons, polyglycidylthioethers, epoxidized fatty acids or drying oils, epoxidized polyolefins, epoxidized diunsaturated acid esters, epoxidized unsaturated polyesters and mixtures thereof. Useful epoxides prepared from polyhydric phenols are described in such publications as U.S. Pat. No. 4,431,782, which is incorporated herein by reference. Epoxy resins can be prepared from mono-, di- and trihydric phenols and include the Novolac resins. Useful epoxy resins also include the epoxidized cycloolefins; as well as the polymeric epoxides which are polymers and copolymers of such monomers as glycidylacrylate, glycidylmethacrylate and allylglycidyl ether. Epoxides useful in the epoxy resin composition of this invention are described, for example, in U.S. Pat. Nos. 3,804,735; 3,892,819; 3,948,698; 4,014,771, 4,119,609, and 4,786,668 which are incorporated herein by reference. Epoxy resins prepared with hydrogenated phenols as taught in U.S. Pat. No. 3,336,241, which is incorporated herein by reference, may also be used.

As is well known in the prior art, epoxy compounds and particularly those of the polymeric type, are described in terms of equivalent weights. The equivalent weight is the molecular weight of the epoxy compound divided by number of epoxy units of the compound. In general, the epoxy compounds useful in the present invention will have an epoxy equivalent weight between about 150 and about 700. Preferably, the epoxy compounds used in the epoxy resin composition of this invention will have epoxy equivalent weights within the range from about 175 to about 300.

Preferred epoxy compounds are glycidyl polyethers of polyhydric alcohols, polyhydric phenols and polyhydric phenol condensation compounds such as bisphenol-A. These epoxy resins are usually made by reacting at least 2 moles of an epihalohydrin or glycerol dihalohydrin with 1 mole of polyhydric alcohol, 1 mole of polyhydric phenol or 1 mole of the polyhydric phenol condensation compound and a sufficient amount of caustic alkali to combine with the halogen of the halohydrin. The products are characterized by the presence of more than 1 epoxy group; i.e., a 1,2-epoxy equivalency greater than 1. Cycloaliphatic epoxy resins are most preferred because they have excellent compatability with the modified hydrogenated block copolymers of the present invention. The excellent compatibility between the cycloaliphatic epoxy resins and the modified hydrogenated block copolymers enables improved dispersion of the epoxy resin, and can enable preparation of compositions which cure to become clear coatings. Because cycloaliphatic epoxy resins are more expensive than aromatic epoxy resins, if a clear composition is desired, it is preferable to use a combination of cycloaliphatic epoxy resins with as much aromatic epoxy resins as possible. The ratio of cycloaliphatic to aromatic epoxy resins may be as low as about 35/65 and still result in clear compositions, but ratios of 50/50 or greater are preferred for improved clarity of the resultant dried and cured coating.

A limitation on the epoxies useful in the present invention is that the epoxy resin must not be a solvent for the modified hydrogenated block copolymer. When the epoxy is such a solvent, rubbery domains do not form until the epoxy cures. This invention requires that rubbery domains exist before curing.

In general, any selectively hydrogenated block copolymer comprising at least one polymeric block comprising predominantly monoalkenyl aromatic hydrocarbon monomer units and at least one polymeric block comprising, before hydrogenation, predominantly conjugated diolefin monomer units which has been selectively hydrogenated and modified by incorporating carboxylic acid, carboxylic anhydride derivative functionality or mixtures thereof can be used as the modified hydrogenated block copolymer of this invention. Preferably dicarboxylic acid or carboxylic anhydride is incorporated as the modifier for the hydrogenated block copolymer. The block copolymer may be linear, branched, coupled radial or sequential. Linear block copolymers useful in the epoxy resin composition of this invention include those described in U.S. Pat. Nos. 3,231,635; 3,265,765 and 3,322,856, which are incorporated herein by reference. In general, linear or branched block copolymers which may be hydrogenated and functionalized and then used in the epoxy resin composition of this invention include those that may be represented by the general formula:

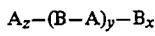
$$A_z-(B-A)_y-B_x$$

wherein:
A is a linear or branched polymeric block comprising predominantly monoalkenyl aromatic hydrocarbon monomer units;
B is a linear or branched polymeric block containing predominantly conjugated diolefin monomer units;
x and z are, independently, a number equal to 0 or 1; and
y is a whole number ranging from 1 to about 20.

Radial block copolymers which may be hydrogenated and functionalized and then used in the epoxy resin composition of this invention also include polymers of the type described in U.S. Pat. Nos. 4,033,888; 4,077,893; 4,141, 847; 4,391,949 and 4,444,953, which are incorporated herein by reference. Coupled and radial block copolymers which may be hydrogenated and functionalized and then used in the epoxy resin composition of this invention include those that may be represented by the general formula:

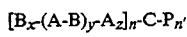
$$[B_{x}\text{-}(A\text{-}B)_y\text{-}A_z]_n\text{-}C\text{-}P_{n'}$$

wherein:
A, B, x, y and z are as previously defined;
n and n' are numbers from 0 to about 100 and where $n+n' \geq 3$
C is the core of the coupled or radial polymer formed with a polyfunctional coupling agent; and
each P is the same or a different polymer block or polymer segment having the general formula:

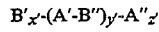
$$B'_{x'}\text{-}(A'\text{-}B'')_{y'}\text{-}A''_{z'}$$

wherein:
A" is a polymer block containing predominantly monoalkenyl aromatic hydrocarbon monomer units which may be the same or different from A;
B' is a polymer block containing predominantly conjugated diolefin monomer units which may be the same or different from B;
A'—B" is a polymer block containing monoalkenyl aromatic hydrocarbon monomer units (A') and conjugated diolefin monomer units (B"), the A'—B" monomer units may be random, tapered or block and when each of A' and B" is blocked, the A' block may be the same or different from A" and B" may be the same or different from B';
x' and z' are, independently, numbers equal to 0 or 1; and
y' is a number from 0 to about 20, and the sum of x' plus y' plus
z' is greater than or equal to 1.

The coupled and radial polymer may, then, be symmetric or asymmetric. For convenience, the linear, branched, coupled and radial polymers which may be hydrogenated and functionalized and then used in the epoxy resin composition of this invention will, sometimes, herein be referred to as base block copolymers.

The base block copolymers of conjugated dienes and alkenyl aromatic which may be utilized in this invention include any of those materials which have 1,2-microstructure contents in the conjugated diolefin block prior to hydrogenation of from about 7% to about 100%, preferably from about 25 to about 65%, more preferably 35 to 55%. The proportion of the alkenyl aromatic blocks in these block copolymers is between preferably about 2 and about 65 percent, and more preferably between about 5 and about 40 percent by weight.

The average molecular weights of the individual blocks may vary within certain limits. The monoalkenyl aromatic blocks will have average molecular weights in the order of about 1,000 to about 125,000, preferably about 2,000 to about 60,000 and most preferably between about 4,000 and about 25,000. The conjugated diolefin blocks either before or after hydrogenation will have average molecular weights in the order of about 10,000 to about 450,000, preferably about 15,000 to about 150,000 and most preferably between about 20,000 and 100,000. These molecular weights are most accurately determined by gel permeation chromotography and/or low angle light scattering techniques.

Hydrogenation of the base block copolymer may be accomplished using any of the methods known in the prior art, the hydrogenation will, preferably, be accomplished using a method such as those taught in U.S. Pat. Nos. 3,494,942; 3,634,549, 3,670,054; 3,700,633 and Re 27,145, which are herein incorporated by reference. Preferably, the hydrogenation will be accomplished using one of the methods taught in U.S. Pat. No. 3,700,633.

Hydrogenation preferably reduces the ethylenic unsaturation of the base polymer to less than 20% of the original ethylenic unsaturation, more preferably the unsaturation is reduced to less than 10% and most preferably to less than 5%. Aromatic unsaturation is preferably reduced by less than 20% by the selective hydrogenation of the base block copolymer, and is more preferably reduced by less than 10%.

As is known in the prior art, hydrogenated or selectively hydrogenated conjugated diolefin polymers containing residual ethylenic unsaturation may be modified with a carboxylic acid or carboxylic acid derivative simply be heating the polymer in the presence of an ethylenically unsaturated carboxylic acid or carboxylic acid derivative. The carboxylic acid or carboxylic acid derivative may be monofunctional such as acrylic, methacrylic, cinnamic, crotonic, isocrotonic, mesaconic, α-methylmesaconic and the like or polyfunctional, particularly difunctional, such as maleic, fumaric, itaconic, citraconic and the like. Functionalization which is accomplished thermally in this manner is taught, for example, in U.S. Pat. Nos. 4,292,414 and 4,308,353 which are incorporated herein by reference. With this process, incorporation of isolated carboxylic acid groups or in some cases a chain thereof onto the polymer backbone is possible. The thermal addition reaction may, of course, involve the use of thermally generated free radicals. As is also known in the prior art, hydrogenated or selectively hydrogenated conjugated diolefin polymers which may or may not contain residual ethylenic unsaturation may be carboxylated by free radical grafting of an unsaturated acid or anhydride onto the polymer at an elevated temperature in the presence of a free-radical initiator. Grafting via a free radical mechanism is taught, for example, in U.S. Pat. No. 4,578,429, which is incorporated herein by reference. Incorporation of the carboxylic acid group or groups via this technique may, however, result in cleavage of the polymer backbone with the carboxyl group or groups being incorporated at the end of one or both of the cleaved segments.

Functionalized hydrogenated block copolymers useful in the epoxy resin compositions of this invention will contain between about 0.01 wt % and about 20 wt % of functional groups as —COOH based on the modified block copolymer. More preferably, they contain between about 0.1 wt % and 5 wt % and most preferably between about 0.5 wt % and about 3.0 wt % of functional groups.

While any of the methods described above can be used to effect functionalization of the block copolymer in the epoxy resin composition of this invention when residual unsaturation is present in the conjugated diolefin polymer, functionalization of the polymer via grafting through a free radical mechanism such as that taught in U.S. Pat. No. 4,578,429 is preferred. This preference is due primarily to the fact that residual ethylenic unsaturation in the conjugated diolefin frequently will be minimal after hydrogenation is complete.

In general, the modified block copolymer will be contained in the epoxy resin composition of this invention in an amount within the range from about 0.5 parts by weight to about 80 parts by weight per 100 parts by weight of epoxy resin, preferably from about 2 to about 40 parts by weight per 100 parts by weight epoxy resin and most preferably from about 5 to about 20 parts per 100 parts by weight epoxy resin.

The stability of the epoxy resin-modified block copolymer dispersion will vary depending on the type of epoxy, the molecular weight of the epoxy, the type of modified hydrogenated block copolymer, the level of functionality of the modified hydrogenated block copolymer, the type of solvent, the polymer concentrations in the solution, and the temperature. Under some conditions, stable dispersions can be formed without the benefit of having the carboxyl functionality reacted with the epoxy, but the conditions under which stable dispersions exist are greatly expanded by the formation of this reaction product. Furthermore, after this reaction product is formed under the high shear mixing required by the present invention, if the composition does phase separate, the two phases are readily redispersed by mixing which would be insufficient to disperse the phases if the carboxylic functionality had not been reacted with epoxy groups. Although Applicant is not bound by theory, it is believed that this enhanced redispersion characteristic is due to the epoxy content of the modified hydrogenated block copolymer phase.

By a stable dispersion, it is meant that the modified hydrogenated block copolymer does not phase separate from the uncured epoxy resin after sitting at room temperature for one week. Formation of a phase stable composition indicates that a sufficient amount of the functionality of the block copolymer has reacted with the epoxy groups to result in a superior coating composition.

Complete reaction between the block copolymer functionality and epoxy groups is not required. Sufficient compatability between the epoxy and the modified hydrogenated block copolymer for formation of a stable dispersion may be achieved with less than complete reaction of the block copolymer functionality. An amount of reaction between the block copolymer functionality and epoxy groups which is effective to achieve stable dispersions is also effective to achieve an excellent coating composition. As used herein, an "effective" amount of reaction between the epoxy groups and the modified hydrogenated block copolymer functionality refers to an amount effective to create a suspension which is a stable dispersion. It is most preferred that substantially all of the block copolymer functionality is reacted with epoxy groups, because this serves to further increase the phase stability of the modified hydrogenated block copolymer uncured epoxy resin composition. By substantially all, it is meant that more than 80 percent of the initial block copolymer acid or acid derivative functionality is reacted with epoxy groups.

Applicant has found that epoxy resin-modified block copolymer blends which have been held at a temperature of 190° C. for 30 minutes or longer have an Infrared (IR) absorption at about 1740 cm$^{-1}$ which is characteristic of ester functionality and have essentially no detectable IR absorption at a wavelength of 1710 cm$^{-1}$, indicating essentially an absence of the acid functionality. Blends which have been made at room temperatures have been found to have some adsorption at 1740 cm$^{-1}$ but still have an absorption at 1710 cm$^{-1}$. It is postulated that although some epoxy may adduct to the acid functionality upon room temperature mixing, the composition must be held at an elevated temperature or exposed to a catalyst to accomplish sufficient reaction to yield, after curing, a glossy, tough coating composition. The examples which follow show that this reaction improves the compatibility of the modified block copolymer in the epoxy composition. Although the mechanism is unknown, this helps minimize the problem of phase separation upon storage, and enables a smooth, tough coating to be formed from these epoxy compositions. Even after the block copolymer is well dispersed in the aromatic epoxy resin and after the adduct of the epoxy on the modified block copolymer is believed to have been formed, the blends are opaque, demonstrating that the block copolymer is not actually dissolved in the aromatic epoxy resin, but is in the form of a relatively stable dispersion.

Cycloaliphatic epoxy resins, such as the diglycidyl ether of hydrogenated bisphenol A, although not good solvents for the block copolymers of this invention, are much more compatible with modified hydrogenated block copolymers than are the aromatic epoxy resins. Therefore, it is much easier to prepare blends of the block copolymer in these epoxy resins. However, high shear mixing at a temperature sufficient for the reaction between the epoxy and the modified hydrogenated block copolymer is still required to achieve phase stable blends and coatings which have a high gloss after being cured.

Suitable dispersions of the modified block copolymer in epoxy resin can be prepared by melt blending the modified hydrogenated block polymer into the epoxy resin in a solvent free process using a high shear mixer. Mixing times and temperatures will depend on the particular epoxy resin and on the equipment used. For blending up to about 15% w block copolymer into a low molecular weight liquid epoxy resin, blending for greater than 15 minutes at a temperature of greater than 150° C. is preferred and most preferably more than one hour at temperatures above 165° C. A simple mixer/emulsifier, such as a Silverson mixer is preferred but other high mechanical energy mixing devices may be used. Maintaining an inert gas blanket over the blend during this step will help maintain light color in the blend. A more heavy duty high shear mixer such as a mill, kneader or extruder will be required to disperse the block copolymer for high concentrations of block copolymer, for higher molecular weight block copolymers, and for higher viscosity epoxy resins.

The severity of high shear mixing is related to the particle size of modified hydrogenated block copolymer formed in the epoxy composition. High shear mixing sufficiently severe to form dispersed modified hydrogenated block copolymer particles of 10 microns or less in number average particle diameter is preferred. High shear mixing sufficiently severe to form particles of 2 microns or less in number average particle diameter is more preferred.

After the epoxy resin and the modified hydrogenated block copolymer are melt mixed, a solvent may optionally be added to decrease the viscosity of the blend to enable easier handling and application. The amount of solvent useful for this purpose is between about 1 and about 40 parts by weight per 100 parts by weight of epoxy resin. More preferably, between about 5 and about 20 parts by weight of solvent are added per 100 parts by weight of epoxy resin.

Preferably, the epoxy resin-modified hydrogenated block copolymer composition is prepared by solution blending. The modified hydrogenated block copolymer will precipitate from solution when epoxy resin is added to a solution of the block copolymer, forming a dispersion. This dispersion must be held under high shear mixing and be heated to a temperature sufficiently high to accomplish the reaction between the modified hydrogenated block copolymer and the epoxy resin. Depending on the particular solvent used and on the intended application of the composition, the solvent can be removed from the blend during this heating step by distillation or retained in the blend to the extent the vapor pressure of the solvent at the elevated temperatures and operating pressure permits. The solution of modified hydrogenated block copolymer is preferably between about 5 and about 30 percent weight modified hydrogenated block copolymer based on the block copolymer plus solvent.

It is preferably that reaction between the epoxy and the carboxyl functionality be minimal until the desired particle size of the dispersion of modified hydrogenated block copolymer in the epoxy resin is achieved. Although Applicant is not bound by theory, it is believed that the block copolymer particles become chemically crosslinked gelled particles by reaction with a small amount of epoxy resin dissolved within the particles during mixing at high temperatures. Crosslinking the block copolymer particles before they have been reduced to the required small size (usually less than about 10 microns) prevents the particles from ever becoming sufficiently small. Large gelled particles cause surface roughness in coatings and renders the product ineffective in the practice of the present invention. The processes of the present invention have been found to consistently result in blends that contain adequately low levels of excessively large particles of block copolymer crosslinked by reaction with epoxy resin. This is particularly important in the preparation of the coating compositions of the present invention because even small amounts of large particle size, gelled copolymer will cause surface roughness, thereby producing a coating having poor gloss.

Formation of large size gel particles is minimized in a process wherein the epoxy resin and the modified block copolymer are melt mixed by high shear melt mixing pellets of modified block copolymer with the functionality in the form of an anhydride. Because anhydrides do not react as rapidly as acids with epoxy groups, it is preferred that only a minimal amount of the functionality be in the acid form before the modified block copolymer is dispersed in the epoxy. The use of a modified hydrogenated block copolymer which has been ground to a fine powder should enhance rapid mixing, but fine powders of modified block copolymers are difficult to prepare without hydrolyzing enough of the surface anhydride groups into the acid form to rapidly form a large, gelled particle when the powder is contacted with the hot epoxy. Therefore, when the composition of this invention is prepared by solvent free, high shear melt mixing modified block copolymers into a hot epoxy resin, it is preferred that the modified block copolymer be in the form of pellets having a number average diameter greater than about 0.01 inches, and that the functionality on the modified block copolymer be substantially in the form of carboxylic anhydrides. More preferred number average particle diameter are from 0.01 to 0.3 inches in number average particle diameter, and most preferred is from about 0.05 to about 0.2 inches in number average particle diameter.

Formation of large particle size gel is much easier to avoid when the composition of this invention is prepared by solution blending the modified block copolymer and the epoxy resin. When solution blending is utilized, the modified block copolymer is dissolved in a solvent and then precipitated under high shear into a small particle size dispersion of the copolymer by addition of the epoxy resin, which is a non-solvent for the copolymer. This mixture is then heated under shear to an effective temperature to accomplish reaction between the functionality on the copolymer and the epoxy functionality on the epoxy resin, preferably above 150° C. and most preferably above 165° C. Because the formation of the dispersed particles of the copolymer is accomplished at ambient temperatures or only slightly above, when solution blending is utilized, the copolymer functionality may be in either the anhydride or acid form.

The epoxy resin composition of this invention may comprise a curing agent. As previously indicated, any of the curing agents known to be effective for curing an epoxy resin composition may be used. As is well known, the curing agent actually selected and its concentration can influence processing characteristics such as pot life, required cure temperature, and the cure rate and the resultant properties of the cured product.

As is well known in prior art, the amount of curing agent used will depend upon many factors such as the particular type of curing agent used, the method of application and cure conditions required, and the balance of hardness, flexibility and solvent resistance needed in the coating. Generally, however, the amount of curing agent used is from 50 to 150% of stoichiometric, with near 100% of stoichiometric being usually preferred. Stoichiometric in this sense is based on curing agent reactive functional groups to epoxy groups.

A wide variety of curing agents are available which can be used in the coating compositions of this invention. Particularly suitable curing agents are amines and amine derivatives which generally contain a plurality of nitrogen atoms. These include aliphatic amines such as ethylene diamine, diethylenetriamine and other homologs thereof, cycloaliphatic amines such as diaminocyclohexane and isophorone diamine, and aromatic amines such as diaminodiphenyl sulfone and the like. Various polyamides can also be used including those formed by reaction of polymeric fatty acids and aliphatic polyamines such as taught in U.S. Pat. No. 2,450,940, which is incorporated herein by reference. Also preferred are aliphatic amine adducts formed by reaction of aliphatic polyamines with polyepoxides.

The epoxy coating compositions of the present invention may be cured with a curing agent which is effective at elevated temperatures or cured with a curing agent which is effective at ambient temperatures. Use of curing agents which require elevated temperatures, such as aromatic amines, permits the curing agents to be combined with the epoxy long in advance of the application of the coating, giving a "single package" coating, but has the disadvantage that the coated workpiece must be subjected to elevated temperatures to cure the coating. Curing agents which are effective at ambient temperatures, such as aliphatic amines, may not be combined with the epoxy compounds until shortly before application of the coating material, making a "two package" coating necessary.

If the epoxy resin-block copolymer-curing agent composition of this invention is too viscous for application to a workpiece at room temperature, a solvent may be incorporated to permit application at room temperature. The solvent may be any solvent known in the art to be effective with both epoxy resins and elastomeric block copolymers. Examples of suitable solvents are aromatic hydrocarbons such as toluene and xylene, aliphatic hydrocarbons such as naphtha and mineral spirits, ketones such as methylisobutyl ketone, esters such as butyl acetate, ethers such as tetrahydrofuran and propylene glycol monomethyl ether and mixtures thereof. These solvents are also useful as the solvent of the solution blending process.

Sufficient solvent must be used to decrease the viscosity to a handleable consistency. Generally, the higher the molecular weight of the block copolymer and the epoxy components and the greater the amount of the elastomer, the more solvent will be required. With a relatively high molecular weight epoxy resin such as one having about 2000 equivalent weight, as would frequently be used in tough epoxy coatings, as much as 50% w solvent would be needed to reduce its viscosity to near 1000 cps. With the compositions of the present invention, as little as 20% w solvent is usually sufficient to reduce the viscosity of epoxy resin/elastomer blends containing up to 15% w elastomer to about 1000 cps.

The solvent used to reduce the viscosity of the coating composition must be sufficiently volatile to vaporize from the coating composition after the coating composition has been applied to a workpiece. The time required for the solvent to vaporize from the composition may vary greatly and is not critical to the present invention. The application of heat may be required to dry and/or cure the coating composition after application to the workpiece.

In addition to the essential components previously identified, the epoxy resin composition of this invention may contain other components such as fillers, pigments, flame retardant agents, plasticiers, stabilizers, extenders, antioxidants, promoters, accelerators, thixotroping agents and the like. The end use applications requiring one or more of these additional compounds are, or course, well known in the prior art and each such additional component will be used at concentrations well known to be effective for an intended purpose.

Coatings comprising epoxy-modified block copolymer compositions made by the process of this invention have excellent toughness, impact resistance and gloss when cured, and before being cured, form stable dispersions which may be stored for extended times before use. Even when the compositions of modified block copolymers and epoxy of this invention do phase separate, they are easily remixed by only mechanical stirring or by agitation with commercial paint-mixing equipment due to the epoxy adducts on the modified block copolymers. These compositions also have, before curing, lower viscosities than similarly impact resistance coating compositions which allows application with a minimal amount of solvent.

EXAMPLES

The following materials were used in the examples. The modified hydrogenated block copolymer was a polystyrene-hydrogenated polybutadiene-polystyrene block copolymer of about 50,000 molecular weight and 30% w styrene content which after selective hydrogenation had been extruder grafted with maleic anhydride in the presence of peroxide. The maleic anhydride level is 1.9% w bound. The low molecular weight, liquid aromatic epoxy resin was a diglycidyl ether of bisphenol A having an epoxy equivalent weight of about 190. The low molecular weight, liquid cycloaliphatic epoxy resin was a diglycidyl ether of hydrogenated bisphenol A having an epoxy equivalent weight of about 235. Curing Agent C111 (SHELL CHEMICAL) is an aliphatic amine adduct supplied at 42% w solids in solvent. Isophorone diamine is a cycloaliphatic amine curing agent. BETTLE 216-8 (AMERICAN CYANAMID) is an aminoplast resin used as an anticratering aid.

EXAMPLE 1

Example 1 demonstrates the effect on viscosity of adding the modified hydrogenated block copolymer to an aromatic epoxy resin and to a cycloaliphatic epoxy resin. In Example 1, Blends 1 through 8 were prepared, each blend containing either the aromatic or the cycloaliphatic epoxy resin described above. Blends 1 and 5 contained pure epoxy resin, and the remaining blends contained various portions of modified hydrogenated block copolymer. Table 1 lists the contents of each blend.

The following procedure was used for preparing Samples 2, 3, 4, 6, 7, and 8. The epoxy resin was heated to 130° C. in an 800 ml beaker on a hot plate. The modified hydrogenated block copolymer, as about 0.1 inch diameter pellets, was added and mixed into the epoxy resin with a Silverson Model L2AIR mixer with Emulsor Screen. The modified hydrogenated block copolymer was dispersed in the epoxy in about 15 minutes, and during this time, the temperature was increased to about 145° C. Heating and vigorous mixing were continued until the blend reached 190° C. This took an additional 15–30 minutes. The blend was then held at 190° C. for 30 minutes under vigorous mixing. The blends were then cooled to room temperature for storage and testing. Brookfield viscosity was measured as a function of shear rate and temperature on the solvent free blends. Brookfield viscosity was also measured as a function of shear rate at 25° C. on blends in which varying amounts of toluene were added. Results were extrapolated to a shear rate of 10 sec$^{-1}$ and are given in Table 1 as the temperature at which a solvent free blend reaches 1 Pa.s and as the toluene content needed to reduce the viscosity at 25° C. to 1 Pa.s. Results show that the presence of the modified hydrogenated block copolymer in the epoxy does indeed increase the viscosity. However, the effect is small when only 5 or 10% w rubber is added to the epoxy and becomes appreciable only when 15% w rubber is added to the epoxy.

TABLE 1

| Viscosity of Epoxy/Rubber Melt Blends | | | | | | | | |
|---|---|---|---|---|---|---|---|---|
| Blend Composition, % w | 1 | 2 | 3 | 4 | 5 | 6 | 7 | 8 |
| Aromatic Epoxy Resin | 100 | 95 | 90 | 85 | | | | |
| Cycloaliphatic Epoxy Resin | | | | | 100 | 95 | 90 | 85 |
| Modified Hydrogenated Block Copolymer | | 5 | 10 | 15 | | 5 | 10 | 15 |
| Viscosity @ 25° C., Pa.s | 12.5 | 24 | 55 | >100 | 1.9 | 4.0 | 10 | 30 |
| Temp, °C., at which Solvent-Free Viscosity is 1 Pa.s | 44 | 52 | 65 | 90 | 32 | 40 | 52 | 80 |
| Toluene Conc, % w, at which Viscosity @ 25° C. is 1 Pa.s | 7 | 10 | 13 | 25 | 2 | 4 | 8 | 15 |

EXAMPLE 2

The solutions in Table 2 were prepared and tested to assess the ability of the modified hydrogenated block copolymer to improve the flexibility of amine cured epoxy coatings. The solutions were prepared by gently rolling the components in a jar on a bottle roller and were then cast on 10 mil thick tin plated steel at the dry film thicknesses shown in Table 2. The 85/15 Blend 4 and 85/15 Blend 8 referred to in Table 2 are the two melt blends prepared in Example 1 which contain 15% w modified hydrogenated block copolymer dispersed in 85% w low molecular weight aromatic epoxy and in 85% w low molecular weight cycloaliphatic epoxy resin, respectively. The coatings were allowed to dry-/cure for 1 week at room temperature. Their ability to resist cracking when bent was tested in the wedge bend test (ASTM D3281-84). In this test, the steel panel with the coating on the outside is bent rapidly with a wedge shaped die forming an OT blend on one side and simulating a bend around a ⅛ inch diameter mandrel on the other side of the 3 inch wide panel. The bend becomes progressively more severe going across the sample from the ⅛ inch mandrel side to the OT side. A very flexible coating will not crack all the way to the OT bend side of the panel. Results are expressed as the distance (in inches) the crack in the bent coating progresses across the panel from the OT bend side toward the ⅛ inch mandrel bend side. The lower the number, the more flexible the coating.

Results in Table 2 show that amine/aromatic epoxy and amine/cycloaliphatic epoxy coatings have poor flexibility since the crack propagates about 2 inches across the 3 inch panel. Results clearly demonstrate that incorporation of modified hydrogenated block copolymer in the coating improves the flexibility of the coating. Some improvement is seen by incorporating as little as 3% w copolymer into the coating. With about 9% w copolymer in the coating, the crack progresses only about 1 inch across the panel.

TABLE 2

| | Flexibility of Epoxy/Rubber Coatings | | | | | | | |
|---|---|---|---|---|---|---|---|---|
| | 1 | 2 | 3 | 4 | 5 | 6 | 7 | 8 |
| Composition of Solution, % w | | | | | | | | |
| Aromatic Epoxy | 39.4 | 26.3 | 13.1 | | | | | |
| Cycloaliphatic Epoxy | | | | | 39.4 | 26.3 | 13.1 | |
| 85/15 Blend 4 | | 13.1 | 26.3 | 39.4 | | | | |
| 85/15 Blend 8 | | | | | | 13.1 | 26.3 | 39.4 |
| CURING AGENT C111 | 56.7 | 56.7 | 56.7 | 56.7 | 56.7 | 56.7 | 56.7 | 56.7 |
| Toluene | 3.9 | 3.9 | 3.9 | 3.9 | 3.9 | 3.9 | 3.9 | 3.9 |
| Composition of Dry Coating, % w | | | | | | | | |
| Aromatic Epoxy | 62.3 | 59.2 | 56.1 | 53.0 | | | | |
| Cycloaliphatic Epoxy | | | | | 62.3 | 59.2 | 56.1 | 53.0 |
| Amine | 37.7 | 37.7 | 37.7 | 37.7 | 37.7 | 37.7 | 37.7 | 37.7 |
| Modified Hydrogenated Block Copolymer | | 3.1 | 6.2 | 9.3 | | 3.1 | 6.2 | 9.3 |
| Thickness of Dry Coating, mil | 2.0 | 1.7 | 1.6 | 0.7 | 0.7 | 0.9 | 1.0 | 0.9 |
| Wedge Bend Crack Distance, inch | 2.0 | 1.7 | 1.3 | 1.0 | 2.2 | 1.1 | 0.9 | 0.9 |

EXAMPLE 3

Example 3 demonstrates the ability of modified hydrogenated block copolymer to improve the impact resistance of amine cured epoxy resin coatings. Four blends were prepared, the contents of which are listed in Table 3. The solutions were again prepared by rolling the ingredients in a jar on a bottle roller. The 85/15 Blend 4 is the melt blend of 15% w modified hydrogenated block copolymer in 85% w low molecular weight aromatic epoxy described in Example 1. The solutions were coated onto 25 mil thick aluminum panels at a film thickness sufficient to result in a 1.5 mil dry coating and the coated panels were dried/cured for 1 hour at 100° C. After conditioning the cured samples at room temperature overnight, reverse impact (ASTM D2794-84) and pencil hardness (ASTM D3363-74) were determined. The results are summarized in Table 3. The data in Table 3 clearly demonstrate the ability of the modified hydrogenated block copolymer of this invention to improve the reverse impact resistance of the epoxy coating. The data in Table 3 also show that this improvement can be accomplished without reduction in pencil hardness of the coating.

TABLE 3

| Impact Resistance of Epoxy/Rubber Coatings | | | | |
|---|---|---|---|---|
| Blend Composition, % w | 1 | 2 | 3 | 4 |
| Aromatic Epoxy | 71.3 | 47.3 | 23.2 | |
| 85/15 Blend 4 | | 24.0 | 48.0 | 63.4 |
| Isophorone Diamine | 16.4 | 16.4 | 16.4 | 14.6 |
| BETTLE 216-8 | 2.3 | 2.3 | 2.3 | 2.0 |
| Toluene | 10.0 | 10.0 | 10.0 | 20.0 |
| Parts copolymer/100 parts epoxy | 0 | 5.3 | 11.3 | 17.6 |
| Reverse Impact Resistance, in-lb | 2 | 12 | 24 | 36 |
| Pencil Hardness | 4H | 5H | 4H | 5H |

EXAMPLE 4

A series of blends of the liquid aromatic epoxy resin with either 10 or 15% w of the modified hydrogenated block copolymer was prepared using different procedures in order to show the impact on coating performance. The 85/15 Blend 4 of aromatic epoxy resin/block copolymer in Table 1 was prepared by the solvent free melt blending technique using about 0.1 inch diameter copolymer pellets as disclosed in this invention. This blend is referred to as Blend A in Table 4.

Blend B in Table 4 is the same as Blend A except it was prepared according to the procedure taught in Japanese Patent NO. 58-17160. That is the modified hydrogenated block copolymer was freeze-pulverized to a powder which would pass through an 80 mesh screen. This powdered block copolymer was then used to prepare a solvent free melt blend using the same procedure for preparing Blend A.

Blend C in Table 4 was prepared by the process of this invention in which the block copolymer is combined with the aromatic epoxy resin via a solvent solution of the copolymer and the blend is heated under shear to 190° C. for about 1 hour. That is, 50.6 parts of a solution containing 20% w block copolymer, 16% w hexane, 48% w methyl ethyl ketone and 16% w of the aromatic epoxy resin was prepared in a beaker using the Silverson L2 high shear mixer. This solution was heated to 65° C. and 49.4 parts of the aromatic epoxy was added. With continuous stirring by the Silverson mixer, the blend was heated under a nitrogen atmosphere to achieve the reaction between the block copolymer and the epoxy resin and to evaporate the solvents.

Blend D in Table 4 was prepared by the solvent solution procedure taught in Japanese Patent Application No. 62-143,912. That is, a solution was prepared containing 100 parts of aromatic epoxy resin, 10 parts of modified hydrogenated block copolymer, 100 parts of toluene and 25 parts of tetrahydrofuran. The solvent was then removed from the blend using a rotary evaporator at 60 rpm and at 60° C.

Blends A–D in Table 4 were mixed with a stoichiometric amount of isophorone diamine, 1.5 mil thick films were cast on steel panels and the coatings were cured 1 hour at 100° C. As shown in Table 4, large differences were seen in the surface appearance of the coatings. The coating made with Blend B had a very rough surface, probably caused by the presence of a large quantity of very large size particles of block copolymer gel which was probably formed during melt mixing of the copolymer powder into the hot epoxy resin. This rough surface causes the poor gloss shown in Table 4 and demonstrates that Blend B made by the process of Japanese Patent No. 58-17160 is unsuitable for use in coatings. Blend D made by the process of Japanese Patent Application No. 62-143,912 is a substantial improvement over Blend B. However, the coating based on Blend D still contains a large amount of grit which seriously detracts from the utility of Blend D in coatings. Blend A made by the melt blending process of this invention is a significant improvement over Blend D. Although both Blend A and Blend D have about the same gloss values, Blend A results in a coating which contains less grit and qualitatively has better appearance. Blend C made by the solvent process of this invention results in an excellent coating, the coating being nearly grit free, having high gloss and having excellent smoothness.

TABLE 4

| | Influence of Epoxy/Rubber Blend Procedure on Coating Gloss[a] | | | | |
|---|---|---|---|---|---|
| Blend | Copolymer Form | Blending/Solvent Stripping Temp, °C. | Cured Coating Surface Smoothness | 20° Gloss | 60° Gloss |
| A | Pellets | 190 | Good | 80 | 115 |
| B | Powder | 190 | Very Poor | 37 | 81 |
| C | Solvent | 190 | Excellent | 114 | 130 |
| D | Solvent | 60 | Fair | 74 | 110 |

[a]Gloss was measured with a BYK Labotron Tri Gloss Mutiangle Reflectometer.

EXAMPLE 5

This example compares characteristics of a modified hydrogenated block copolymer melt-blended into an aromatic epoxy resin, a cycloaliphatic epoxy resin, and combinations thereof. Five blends were prepared. The compositions are listed in Table 5. These compositions were prepared by melt blending the components in a Silverson high-shear mixer at 130° C., and then elevating the temperature of the compositions to 190° C. for 30 minutes. The compositions were then cooled and a stoichiometric amount of isophorone diamine curing agent was added. The compositions were then cast onto steel plates at a 1.5 mil dry coating thickness and cured for 1 hour at 100° C. The smoothness of the cured surface was rated qualitatively, as was the phase stability and clarity of the epoxy composition before blending with isophorone diamine. These ratings are also included in Table 5. The phase stability was noted by dectable phase separation after storage at room temperature for 7 days.

Blend 1, containing only aromatic epoxy resin phase separated upon storage at ambient temperature, and was an opaque composition. The cured coating prepared from Blend 1 had good smoothness, but contained some grit. Blend 5, containing only cycloaliphatic epoxy resin was clear and did not separate upon storage, and the cured coating prepared from this blend had excellent smoothness. Blends 2, 3, and 4 contained varying ratios of aromatic to cycloaliphatic epoxy resins. It can be seen from the data of Table 5 that cured coatings which have excellent smoothness may be prepared from epoxy compositions containing combinations of aromatic and cycloaliphatic epoxy resins, as long as a sufficient proportion of the epoxy resin is cycloaliphatic.

TABLE 5

| Properties of Blends Based on Aromatic/Cycloaliphatic Epoxies | | | | | |
|---|---|---|---|---|---|
| Melt Blend Composition, % w | 1 | 2 | 3 | 4 | 5 |
| Aromatic Epoxy | 90 | 67.5 | 45 | 22.5 | |
| Cycloaliphatic Epoxy | | 22.5 | 45 | 67.5 | 90 |
| Modified Hydrogenated Block Copolymer | 10 | 10 | 10 | 10 | 10 |
| Clarity Phase | Opaque | Very Hazy | Slightly Hazy | Clear | Clear |
| Stability | Separates | Separates | Stable | Stable | Stable |
| Cured Coating Surface Smoothness | Good | Very Good | Excellent | Excellent | Excellent |

I claim:

1. A coating composition comprising:
   a) 100 parts by weight of an epoxy resin; and
   b) from about 0.5 to about 80 parts by weight of rubber having a number average particle diameter of less than 2 microns derived from a modified hydrogenated block copolymer comprising at least one polymeric block comprising predominantly monoalkenyl aromatic hydrocarbon monomer units and at least one polymeric block comprising, prior to hydrogenation, predominantly conjugated diolefin monomer units wherein the modified hydrogenated block copolymer is functionalized with from 0.1 to about 20% by weight, as —COOH, of functional groups, the functional groups being substantially grafted to the block comprising predominantly conjugated diolefin monomer units and the functional groups are derived from compounds selected from the group consisting of monocarboxylic acids, dicarboxylic acids, carboxylic acid anhydrides and mixtures thereof, wherein an amount of the functionality of the modified hydrogenated block copolymer has reacted with epoxy groups of the epoxy resin to crosslink the rubber particles and to result in stable dispersion of the crosslinked modified block copolymer rubber particles in the epoxy resin.

2. The composition of claim 1 wherein the modified hydrogenated block copolymer comprises between about 2 to 65 percent by weight monoalkenyl aromatic monomer units.

3. The composition of claim 1 wherein the modified hydrogenated block copolymer comprises between about 5 and about 40 percent by weight monoalkenyl aromatic monomer units.

4. The composition of claim 1 wherein the epoxy resin has an epoxy equivalent weight within a range from about 150 and about 700.

5. The composition of claim 1 wherein the monoalkenyl aromatic hydrocarbon monomer units of the modified hydrogenated block copolymer are styrene units.

6. The composition of claim 1 wherein the composition comprises from about 2 to about 40 parts by weight of modified hydrogenated block copolymer.

7. The composition of claim 1 wherein the modified hydrogenated block copolymer contains between about 0.1 wt % and about 10 wt % functional groups as —COOH.

8. The composition of claim 1 wherein the epoxy resin is a resin selected from the group consisting of aromatic epoxy resins, cycloaliphatic epoxy resins, aliphatic epoxy resins and combinations thereof.

9. The composition of claim 1 wherein the epoxy resin contains cycloaliphatic and aromatic resins in a ratio of cycloaliphatic to aromatic resins greater than about 35/65.

10. The composition of claim 1 wherein essentially all of the functional groups are reacted with epoxy groups of the epoxy resin.

* * * * *